S. PHILLIPS.
SUCTION GAS GENERATOR.
APPLICATION FILED AUG. 7, 1919.

1,382,118.

Patented June 21, 1921.

Inventor
S. Phillips,
By H. R. Kerslake
Attorney

UNITED STATES PATENT OFFICE.

STANLEY PHILLIPS, OF ILUKA, NEW SOUTH WALES, AUSTRALIA, ASSIGNOR TO THE EFFICIENT GAS POWER COMPANY LIMITED, OF SYDNEY, NEW SOUTH WALES, AUSTRALIA.

SUCTION GAS-GENERATOR.

1,382,118. Specification of Letters Patent. Patented June 21, 1921.

Application filed August 7, 1919. Serial No. 315,942.

*To all whom it may concern:*

Be it known that I, STANLEY PHILLIPS, a subject of the King of Great Britain and Ireland, residing at Iluka, Clarence River, State of New South Wales, Commonwealth of Australia, have invented certain new and useful Improvements in and Relating to Suction Gas-Generators, of which the following is a specification.

The present invention relates to suction gas generators, and it refers particularly to those generators in which steam for induction into the bed of fuel in the furnace of the generator is generated and superheated in a chamber which encircles the furnace.

My generating apparatus comprises a furnace, an ashpit below same, a steam generating and superheating chamber encircling the furnace which is in communication at its lower end with the grate of the furnace through a series of ports in the walls of the ashpit, means for feeding water and air to said chamber, means for feeding fuel to the furnace, a gas washer, and a radiator for cooling the gas after it has been passed through the washer. The washer may be fitted with means for returning the water used therein for washing the gas from the bottom to the top thereof for re-use in washing further supplies of gas entrained to it.

The generator is capable of use in the production of producer gas, water gas or semi-water gas, although it has been designed principally for producing semi-water gas. The fuel used in the furnace may be wood charcoal, coke or the like.

Figure 1:
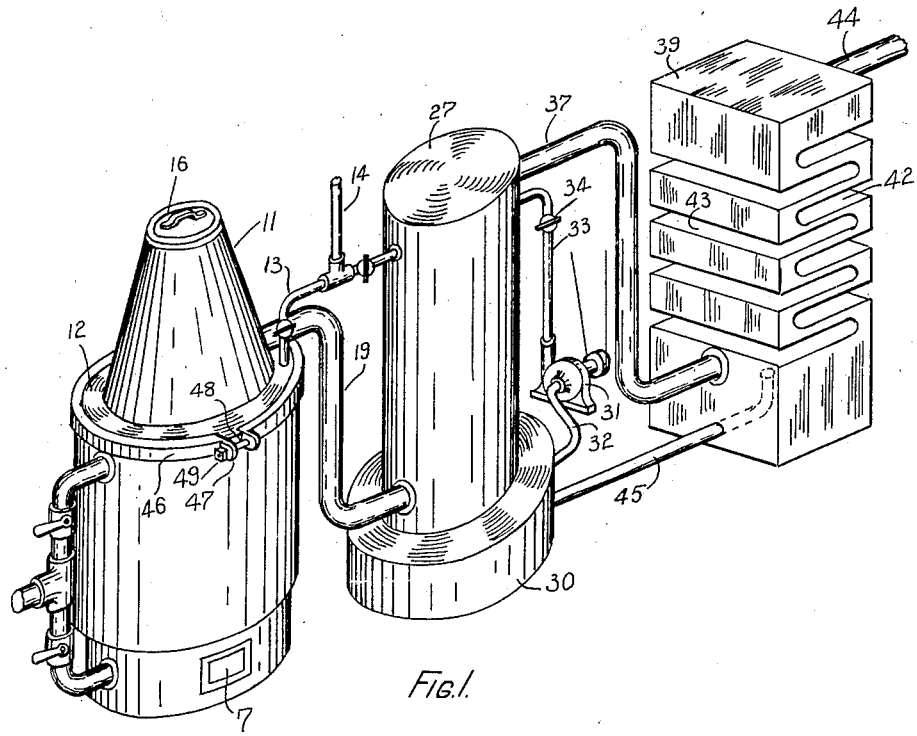
Figure 2:
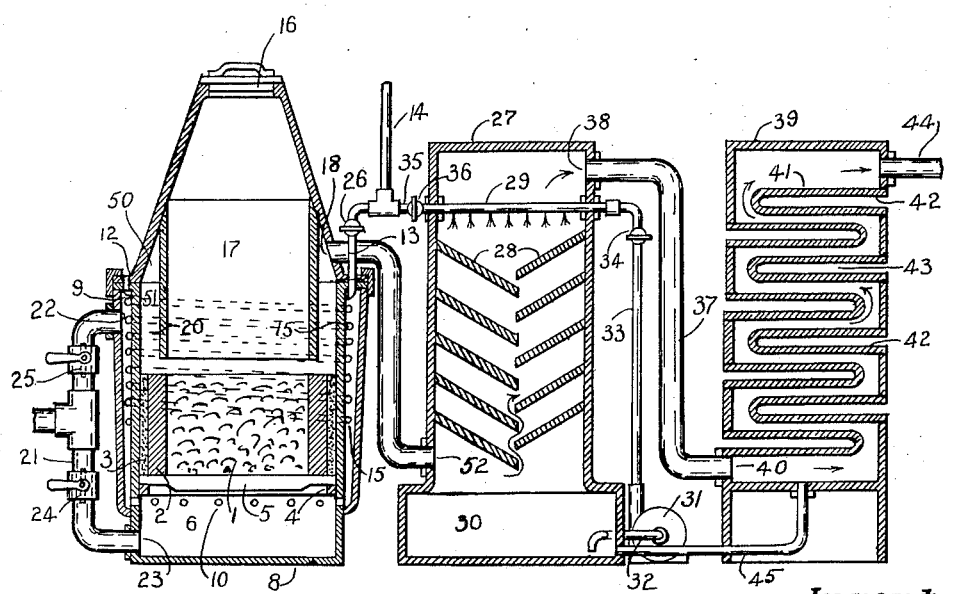

In the accompanying drawings I have illustrated a generator in accordance with the invention, in which Figure 1 is a perspective view illustrating the generator, washer, and radiator connected together by pipes, water and air feed means, and means for feeding fuel to the furnace of the generator; and Fig. 2 is a longitudinal section of the apparatus shown in Fig. 1.

The generator is constructed of metal and is provided with a furnace 1 which is lined with fireclay 2, the latter having around it a sheet of asbestos or other heat insulating material 3 which serves to keep the fireclay lining 2 out of contact with the walls of the generator. These walls carry brackets 4 upon which rest the firebars 5 which support the fireclay lining 2. Below the furnace is the ashpit 6 which is furnished with a door 7 and a bottom 8. The generator is preferably circular in cross section and is constructed of galvanized iron.

Enveloping the side walls of the generator is the steam generating and superheating chamber 9 which is also constructed of galvanized iron and is in communication at its lower portion with the ashpit 6 through the openings 10 therein. The lower end of the chamber 9 is fastened to the side walls of the generator below the openings 10, but these openings are directly below the firebars 5 to enable steam or a mixture of steam and air to be inducted into the bed of fuel in the furnace 1 from the chamber 9. Supported on the top of the chamber 9 is the fuel feed hopper 11 preferably made of galvanized iron whose lower end is flanged at 12 and extends over the upper end of the chamber 9. The flange 12 and the flange 51 on the chamber 9 are slotted to receive the pipe 13 which is connected with the main water supply pipe 14. There may be a series of pipes similar to the pipe 13 connected with the water main 14, in which event a series of openings are provided in the flanges 12 and 51 for their reception. The hopper 11 is secured to the generator by tie bands 46, the ends of which are offset at 47 and are secured together by bolts 48 and nuts 49. Coiled around and secured to the walls of the generator is the wire spiral 15 preferably made of galvanized iron. This wire spiral extends from the top of the chamber 9 to a point about the center of the fireclay lining 2; it is welded to the walls of the generator when in position thereon, and the generator is galvanized after the wire has been secured thereto. The hopper 11 is furnished at its head with a lid or cover 16, and it has securely fastened to it on its interior a hood or chute 17 which depends downwardly from the hopper to a position above the top end of the fireclay lining 2, so as to leave a space between it and such lining. The hood or chute 17 is disposed in relation to the walls of the generator so that there will be a space 20 between it and the generator walls, and its top is fastened to the hopper 11 above the gas outlet 18 in the wall of the hopper to which the pipe 19 is connected. It will be noted that the top of the generator is open to the space 50 above it which is inclosed by the upper end of the chute 17 and the lower portion of the hopper 11 and that the gas outlet 18 in the wall of the hopper is in communication with this space.

To enable air to be supplied to the furnace 1 I provide a fan or like air blowing means which is connected with the trunk 21. This air trunk is open at one end through the port 22 with the steam generating and superheating chamber 9, while its other end communicates through the port 23 in the ashpit 6 with the furnace 1. Dampers 24 and 25 are fitted in the trunk 21 to control the supply of air either to the ashpit 7 or the chamber 9. When a supply of wood charcoal or coke has been fed to the furnace 1 and has been ignited, the fan may be set in operation after the damper 25 has been closed and the damper 24 has been opened, to cause a blast of air to be delivered to the bed of fuel; but when a mixture of steam and air is to be fed to the bed of fuel in the furnace, the fan is disconnected and the damper 24 is closed and the damper 25 opened, so that a supply of air and steam will be free to be drawn by suction through the chamber 9 and the openings 10 into the ashpit 6 and from thence into the bed of fuel. It is only necessary to utilize the fan for the purpose of blowing air to the bed of fuel when it is to be sufficiently ignited, as the supply of air needed for admission to the furnace when the generator is in working condition is drawn thereinto by the suction of the engine or other air inspirating apparatus connected with the generator. Water is fed from the pipe 13 onto the wire spiral 15, and on its passage downward on the spiral it is heated and converted into steam, which is superheated before it is admitted to the bed of fuel in the furnace 1, as the chamber 9 in which it is generated and from which it passes to the bed of fuel in the furnace is positioned around the furnace 1 and is subjected directly to the heat thereof. The pipe 13 is furnished with a control cock 26 through which the supply of water to the wire spiral 15 from the main water supply pipe 14 may be regulated.

Gas from the generator is entrained to the washer 27 through the pipe 19 which is in communication respectively with the outlet port 18 in the wall of the hopper 11 and the port 52 in the lower portion of the washer. The latter is provided interiorly with a plurality of baffle plates 28 which are disposed over each other and are secured to its walls. These plates are preferably inclined to each other and are arranged with intervening spaces for the passage of gas between them from the lower to the upper portion of the washer. Arranged above the plates 28 is a rose 29 through which water is supplied over the plates to the gas in its upward passage through the washer. At the lower portion of the latter a water sump 30 is provided to collect the water which flows over the plates 28. The sump 30 may be fitted with an overflow vent, or a pump 31 may be connected with it, by means of which water may be withdrawn therefrom through the pipe 32 and returned to the rose 29 through the pipe 33, when it is desired to re-use the water which is collected in the sump for the purpose of washing further supplies of gas admitted to the washer from the generator. A cleaning hole may also be provided in the sump 30 to permit dirt accumulated therein to be removed therefrom. In the pipe 33 is a valve 34 which is closed when a fresh supply of water is to be admitted to the rose 29 from the main supply pipe 14 through the pipe 35. The latter pipe is also fitted with a cock 36, by means of which a supply of water to the rose 29 may be prohibited, when the water in the sump 30 is to be re-used and the valve 34 is open to admit water to the washer by the operation of the pump 31.

The passage of the gas through the washer 27 is in a direction contrary to the flow of water therein, and the baffle plates 28 are so disposed to each other that the gas in passing upwardly through the spaces between the plates is brought directly in contact with the descending current of water, which deprives the gas of any particles of dust which it contains and carries them to the sump 30. Leading from the washer 27 is the pipe 37 having communication respectively with the washer through the port 38 therein and with the radiator 39 through the port 40 in its lower portion. The radiator comprises a chamber which is divided by baffles 41, which consist of rectangular tubes arranged over each other but with spaces between them, to permit of gas passing from the foot of the radiator to the head thereof. The baffles are preferably constructed so that their inner adjacent ends are joined but their outer ends are separated from each other; they extend across the chamber and are arranged so that certain of them project from the rear wall of the radiator while the others project from the front wall thereof. Each of the baffles on one of the walls of the radiator overlies each of the baffles on the other wall thereof, but spaces are left between them and the front and rear walls of the radiator to permit passage of gas therethrough. The ends of the baffles are secured to the side walls of the radiator and their outer sides or ends are carried in the front and rear walls of the radiator. In Fig. 2 of the drawings the baffles 41 are shown constructed of metal plates bent to U-shape which are inserted through openings 42 in the front and side walls of the radiator 39. It will be understood, however, that the baffles 41 may consist of tubes the sides of which are closed but whose ends are open to atmosphere so that air may have free access to the space 43 within the tubes. The ends of the baffles 41 are secured to the walls of the radiator by solder or other suitable joints. As the baffles offer a wide surface for contact of the gas against them in its passage to the outlet 44 from the radiator and as their outer ends are open to atmosphere and air is free to enter the space 43, they are adapted to cool the gas and to enable deposit of any water which it carries. The water collects in the bottom of the radiator and flows therefrom by gravity through the pipe 45 to the sump 30.

My generating apparatus may be connected directly to an engine to which gas is to be supplied, or the gas may be stored in a bell or other suitable receiver, from whence it may be withdrawn when it is required for use. If, however, the gas is to be stored in a bell or other receiver it is necessary to connect in series with my generator a fan or other suitable exhausting apparatus capable of causing an inspiration of air and steam through the furnace and the gas through the apparatus, so that the latter may be collected in the receiver. When the generator is connected to an engine the movements of the piston of the latter produce the necessary suction for drawing air and steam into the furnace and the gas through the apparatus.

In operation, after fuel has been fed to the furnace 1 and has been fully ignited, and the lid 16 has been closed on the hopper 11, the fan may be disconnected; the damper 24 being closed, while the damper 25 is opened, the suction caused by the engine or other air inspirating apparatus enables air to be drawn into the chamber 9 and to intermingle with the steam generated therein. The mixture of steam and air is inducted through the openings 10 in the ashpit 6 into the furnace 1 and the gas which is generated by the burning of the fuel in the latter is entrained to the washer 27 where it is deprived of any particles of dust which it carries. From the washer 27 the gas passes to the radiator 39 where it is cooled and from whence it is conducted either to an engine or to a bell or other receiver.

What I claim as my invention and desire to secure by Letters Patent is:—

1. A suction gas generator comprising a gas generating chamber, a wire spiral fastened around the exterior of the wall thereof and galvanized thereon, a steam generating and superheating chamber secured to the gas generating chamber and inclosing the wire spiral a furnace in the last mentioned chamber including brackets secured to the side walls thereof, firebars carried on the brackets and a fireclay lining for said furnace supported on said firebars, an ashpit below said firebars, and the side walls of the ashpits being provided with a plurality of openings establishing communication with the steam generating chamber, a fuel feed hopper mounted on the head of said steam generating chamber and having a gas outlet port in one of its walls, a lid for the hopper, a chute fastened to the interior of the hopper above said port and depending centrally thereon with its lower end located above said fire clay lining, means for feeding water to said wire spiral and means for feeding air to said steam generating chamber or said ashpit substantially as described.

2. In combination with a gas suction generator as claimed in claim 1 an air trunk establishing communication respectively with the ports in the walls of said steam generating and superheating chamber and said ashpit and controllable dampers in the trunk.

In testimony whereof I have affixed my signature in the presence of two witnesses.

STANLEY PHILLIPS.

Witnesses:
H. J. DAVIS,
H. C. CAMPBELL.